(12) United States Patent
den Bakker

(10) Patent No.: US 6,359,941 B1
(45) Date of Patent: Mar. 19, 2002

(54) SYSTEM AND METHOD FOR IMPROVED REFERENCE THRESHOLD SETTING IN A BURST MODE DIGITAL DATA RECEIVER

(75) Inventor: Ton den Bakker, Barneveld (NL)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/070,049

(22) Filed: Apr. 30, 1998

(51) Int. Cl.[7] ............................................. H04L 25/00
(52) U.S. Cl. ...................................................... 375/317
(58) Field of Search ................................. 375/316, 317, 375/318; 359/189

(56) References Cited

U.S. PATENT DOCUMENTS 5,430,766 A * 7/1995 Ota et al. .................... 375/318

* cited by examiner

Primary Examiner—Chi Pham
Assistant Examiner—Kevin M Burd

(57) ABSTRACT

A system and method for automatically setting an advantageous reference threshold in a burst mode receiver to reduce the burst mode penalty associated with prior art burst mode optical data transmissions, and to reduce duty cycle distortion at the receiver output. In a preferred embodiment, the maximum excursion of a received data signal is compared to an offset threshold equal to approximately twice the offset voltage supplied by an offset generator. If the data signal amplitude is less than the offset threshold, then the reference threshold voltage is set approximately equal to the offset voltage. If, on the other hand, the data signal amplitude is greater than or approximately equal to the offset threshold, then the reference threshold is set to one-half of the difference between the maximum and minimum excursions of the data signal (i.e. the difference amplitude). In another embodiment of the invention, the reference threshold is set to a fractional value of the sum of the difference amplitude and the offset voltage. The fractional value is selected so that the reference threshold is approximately equal to one-half of the difference amplitude. An optional selector enables selective variation of the fractional value to compensate for changes in the offset voltage in order to maintain the reference threshold at the optimal value of approximately one-half of the difference amplitude.

8 Claims, 3 Drawing Sheets

SYSTEM AND METHOD FOR IMPROVED REFERENCE THRESHOLD SETTING IN A BURST MODE DIGITAL DATA RECEIVER

BACKGROUND OF THE INVENTION

1. Field of the Invention

The present invention relates generally to digital data receivers for receiving burst mode digital data, and more particularly to a system and method for reducing the burst mode penalty and output signal duty cycle distortion suffered by the receiver during digital data transmissions by automatically selecting an advantageous reference threshold.

2. Description of the Related Art

Digital optical communication between modem computer systems may be accomplished using either continuous or burst mode data transmissions. Conventional AC-coupled optical receivers are typically used for continuous data transmissions, while DC-coupled optical receivers are used for burst mode transmissions. Passive optical networks utilizing burst mode data transmission have proliferated in recent years. Because AC-coupled receivers are generally superior in sensitivity and performance to DC-coupled receivers, attempts have been made to adapt AC-coupled receivers for use with burst mode data transmissions. Typically this has been accomplished by encoding burst mode transmitted data to enable an AC-coupled receiver to interpret and process the transmissions. However, in passive optical networks the transmission media must be shared by several users—each user is allowed to transmit in a dedicated time slot only and is required to be "silent" outside the dedicated time slot. Thus, data encoding is not possible in passive optical networks because an encoded data signal would not exhibit the required time slot information.

DC-coupled receivers that receive burst mode data transmissions suffer from a decrease in sensitivity and signal power that is often referred to as a "burst mode penalty". Typically, by the time a digital data signal is received by a DC-coupled receiver, the signal pulse shapes are degraded to an analog-type pulse shapes having uncertain amplitudes. In previously known DC-coupled receivers, the digital data signal is compared to a fixed reference threshold voltage in a decision circuit of the receiver to recover the pure digital signal. Thus, when uncertain and widely varying signal amplitudes are compared to the fixed reference threshold voltage, identification of logic ONEs and ZEROes is erratic and results in a high burst mode penalty and distortion. Accordingly, in recent years attempts have been made to develop techniques to improve the ability of a DC-coupled receiver decision circuit to identify logic ONEs and ZEROEs with greater certainty to improve receiver performance characteristics. In particular, industry efforts have been directed to reducing the burst mode penalty.

One such technique, described in U.S. Pat. No. 5,025,456 to Ota et al., provides a DC-coupled receiver with adaptive threshold circuitry for providing a varying reference threshold voltage that adapts to the amplitudes of the received digital data signal. The reference threshold voltage amplitude is set to one half of the minimum and maximum excursion of the data signal. Thus, the reference threshold voltage automatically follows the changes of amplitudes in the data signal and provides improved identification of logic ONEs and ZEROes, resulting in a significant reduction in the burst mode penalty suffered by the DC-coupled receiver.

However, the adaptive threshold approach suffers from a significant disadvantage. All digital data receivers are subject to noise that is generated by a variety of internal and external sources. Thus, one of the requirements in a DC-coupled burst mode receiver is that the receiver output must be "silent", i.e. at zero amplitude without a signal at the input of the receiver, to reduce or eliminate the noise. This is functionally accomplished by applying an extra offset voltage at the threshold level of sufficient amplitude to overcome the input and internal noise. Accordingly, the adaptive threshold is actually a sum of the offset voltage amplitude and one half of the difference between the maximum and minimum excursions of the received data signal. Thus, the reference threshold level is not actually in the desirable middle position between the maximum and minimum excursions of the data signal, but is then always above the middle position. As a result, a DC-coupled receiver equipped with adaptive threshold circuitry still suffers from degradation in sensitivity/signal power (i.e. burst mode penalty) of at least 3 dB. Another disadvantage of the adaptive threshold approach is that significant duty cycle distortion is present at the receiver output when low amplitude data signals are received at the receiver input.

Thus, it would be desirable to provide a DC-coupled receiver with the ability to automatically set an advantageous reference threshold that reduces the burst mode penalty suffered by the receiver and that reduces duty cycle distortion at the receiver output when low amplitude data signals are received at the receiver input.

SUMMARY OF THE INVENTION

In accordance with the present invention, a system and method for automatically setting an advantageous reference threshold in a burst mode receiver to reduce the burst mode penalty associated with burst mode optical data transmissions, and to reduce duty cycle distortion at the receiver output, are provided.

The system of the present invention is implemented in a burst mode digital data receiver having an input and an output. The system includes an optional transimpedance preamplifier, connected to the receiver input, for amplifing a received digital data signal; an offset generator, connected to the preamplifier, for generating an offset voltage of sufficient amplitude to eliminate noise at the receiver output, when the data signal is absent at the receiver input; a signal processor, connected to the offset generator, for automatically setting the reference threshold voltage to an advantageous value in accordance with the invention; and an optional output amplifier connected to the preamplifier and the signal processor for amplifying the digital data signal before the signal is processed by other receiver circuitry.

In a preferred embodiment of the invention, the signal processor compares the amplitude (i.e. maximum excursion) of the received data signal to an offset threshold equal to approximately twice the offset voltage amplitude. If the data signal amplitude is less than the offset threshold, then the signal processor sets the reference threshold voltage approximately equal to the offset voltage. If, on the other hand, the data signal amplitude is greater than or approximately equal to the offset threshold, then the signal processor sets the reference threshold to exactly one half of the difference between the maximum and minimum excursions of the data signal. Thus, when the data signal amplitude is very low (i.e. lower than twice the offset voltage amplitude) the data signal is assumed to be generated by noise and the reference threshold at the output will be substantially equal to the offset voltage, producing a silent receiver output. When, on the other hand, the data signal substantially equals or exceeds the offset threshold, the reference threshold is set to exactly one-half of the maximum and minimum excursions of the data signal, without the addition of the offset voltage to the threshold as is done in the previously known adaptive threshold approach. This arrangement virtually eliminates the burst mode penalty, thus improving receiver sensitivity, and furthermore eliminates duty cycle distortion.

In another embodiment of the invention, the signal processor sets the reference threshold to a fractional value of the following expression:

[(maximum data signal excursion−minimum data signal excursion)+offset voltage]

The fractional value is selected so that the resulting reference threshold is approximately equal to one-half of the difference between the maximum and minimum excursions of the data signal. As a result, the reference threshold is set to the desirable mid-point position between the maximum and minimum excursions without the undesirable addition of the offset voltage to the threshold as in the previously known adaptive threshold approach. Optionally, a selector may be connected to the signal processor to enable selective variation of the fractional value to compensate for changes in the offset voltage.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

In the drawings, wherein like reference characters denote corresponding or similar elements throughout the various figures.

DETAILED DESCRIPTION OF THE PREFERRED EMBODIMENTS

The system and method of present invention are described herein with reference to common electronic components such as preamplifiers, voltage generators, peak detectors, clock/data recovery circuits, and amplifiers that are well known in the art. Accordingly, the construction of the electronic components of the invention need not be discussed in detail and such components will be described only with respect to their functionality.

Figure 1:
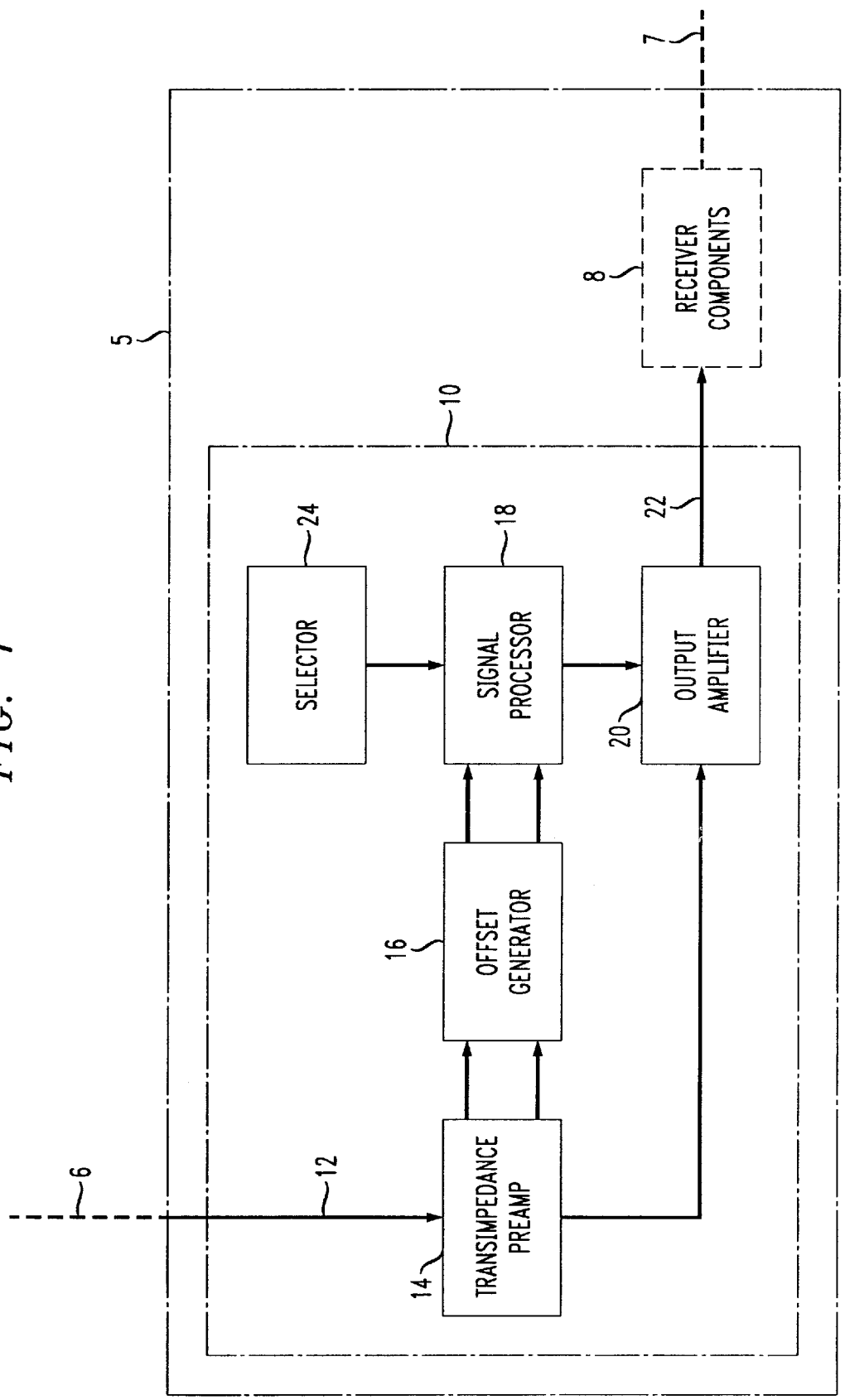
FIG. 1 is a schematic block diagram of a reference threshold setting system used in a burst mode digital data receiver in accordance with the present invention.

Referring now to the drawings, and initially to FIG. 1 thereof, a reference threshold setting system 10 is shown. The reference threshold setting system 10 is preferably implemented in a burst mode digital data receiver 5, having an outside input 6 for receiving a digital data signal having a maximum and a minimum excursion, and an output 7 that is connected to a receiver component system 8. The component system 8 may include a clock/data recovery circuit, an amplifier and other typical receiver components (not shown).

The system 10 includes an input signal line 12 for receiving the data signal from the receiver outside input 6, an optional transimpedance preamplifier 14 for amplifying the received data signal, an offset generator 16, connected to the preamplifier 14, for generating an offset voltage of sufficient amplitude to eliminate noise at an output signal line 22 (connected to the component system 8) when the data signal is absent at the input signal line 12, a signal processor 18, connected to the offset generator 16, for analyzing the data signal and for setting an advantageous reference threshold voltage for application to the data signal, and an optional output amplifier 20, connected to the preamplifier 14, the signal processor 18 and the output signal line 22, for amplifying the digital data signal before the signal is passed via the output signal line 22 to the component system 8 for further processing.

In a preferred embodiment of the invention the signal processor 18 detects the maximum and minimum excursions of the data signal, determines the difference between the maximum and minimum excursions (hereinafter the "difference amplitude") of the received data signal and compares the difference amplitude to an offset threshold that is equal to approximately twice the offset voltage amplitude generated by the offset generator 16. If the difference amplitude is less than the offset threshold, then the signal processor 18 sets the reference threshold voltage approximately equal to the offset voltage. If, on the other hand, the difference amplitude is greater than or approximately equal to the offset threshold, then the signal processor sets the reference threshold to exactly one-half of the difference amplitude before applying the reference threshold to the output amplifier 20. Thus, when the difference amplitude is very low (i.e. lower than twice the offset voltage amplitude), the data signal is assumed to be generated by noise and the reference threshold at the output amplifier 20 will be substantially equal to the offset voltage, producing a silent receiver output due to the offset voltage applied by the offset generator 16. When, on the other hand, the difference amplitude substantially equals or exceeds the offset threshold, the reference threshold is set to exactly one-half of the difference amplitude, without the addition of the offset voltage to the threshold as in the previously known adaptive threshold approach. This arrangement virtually eliminates the burst mode penalty thus improving receiver sensitivity, and furthermore eliminates duty cycle distortion.

Figure 2:
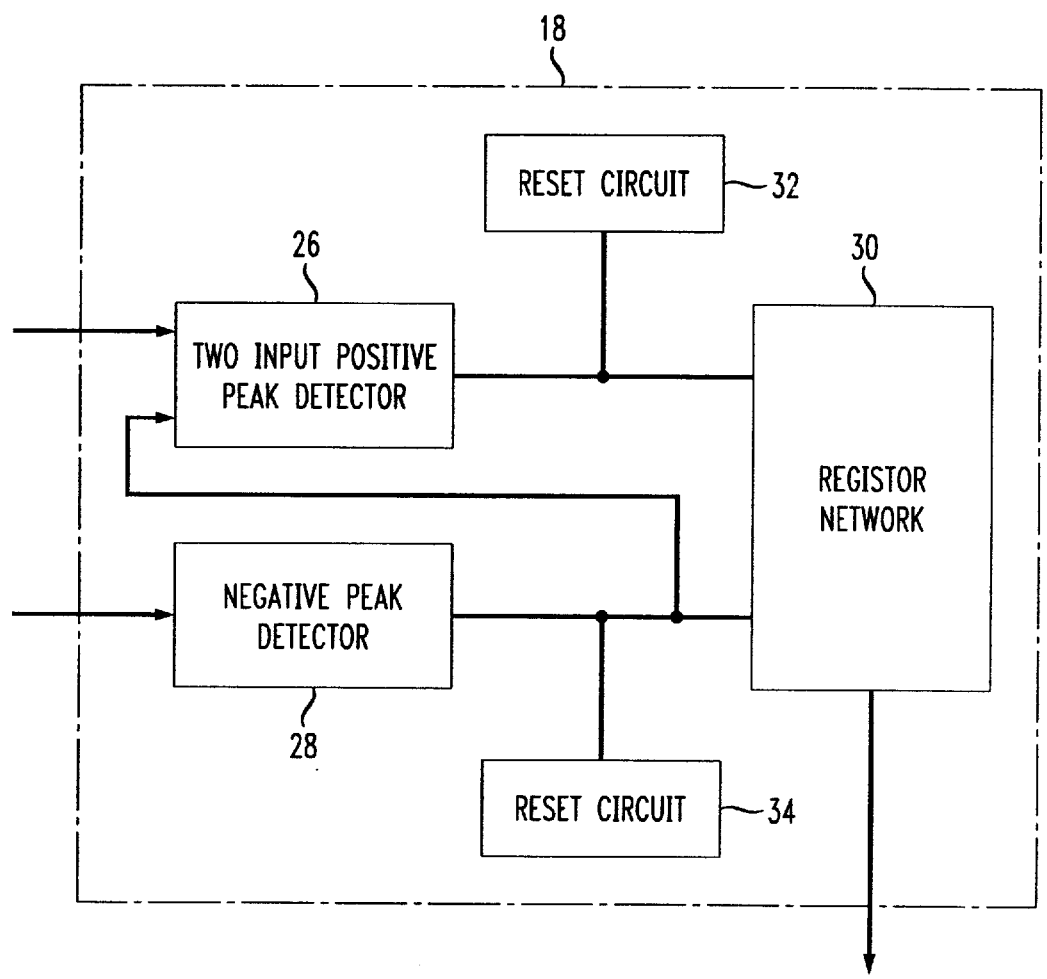
FIG. 2 is an exemplary block diagram of a signal processor of a preferred embodiment of the reference threshold setting system of FIG. 1 in accordance with the present invention.

FIG. 2 depicts an exemplary signal processor 18 in accordance with a first embodiment of the invention. The signal processor 18 includes a two input positive peak detector 26 for detecting the maximum excursion of the data signal, a negative peak detector 28 for detecting the minimum excursion of the data signal, and a resistor network 30 for setting the reference threshold equal to one half of the total output (i.e. the difference amplitude) of the two input positive peak detector 26 and the negative peak detector 28. The first input of the two input positive peak detector 26 is connected to the offset generator 16, while the second input is connected to the output of the negative peak detector 28. The output of the two input positive peak detector 26 is connected to the resistor network 30. The input of the negative peak detector 28 is connected to the offset generator 16, while the output is connected to the resistor network 30. The output of the resistor network 30 is connected to the output amplifier 20. Preferably, the offset generator 16 supplies a negative offset voltage to the first input of the two input positive peak detector 26, and a positive offset voltage of equivalent amplitude to the input of the negative peak detector 28. Optionally, a reset circuit 32 may be connected to the output of the two input positive peak detector 26, and a reset circuit 34 may be connected to the output of the negative peak detector 28, for discharging the two input positive peak detector 26 and for charging the negative peak detector 28, respectively, at the end of a data signal burst.

Because the minimum excursion of the data signal is typically zero, the difference amplitude is typically substantially equal to the maximum excursion of the data signal; thus, the negative peak detector 28 outputs the amplitude of the positive offset voltage generated by the offset generator 16. The two input positive peak detector 26 outputs the maximum excursion of the highest of its two inputs. One input of the resistor network 30 detects the maximum amplitude of the output of the negative peak detector 28 (i.e. the positive offset voltage), the other input detects the amplitude of a sum of the maximum excursion of the data signal and the negative offset voltage. When the data signal maximum excursion is substantially equal to or lower than twice the amplitude of the offset voltage, both the two input positive peak detector 26 and the negative peak detector 28 output the positive offset voltage to the resistor network 30. Halving the total output of the peak detectors 26 and 28, the resistor network 30 produces a reference threshold voltage at the output amplifier 20 that is substantially equivalent to the positive offset voltage. When on the other hand, the data signal maximum excursion is substantially equal to or above twice the offset voltage amplitude, the two input peak detector 26 outputs the data signal maximum excursion (or the difference between the maximum and minimum excursions of the data signal when the minimum excursion is not zero) added with the negative offset voltage to the resistor network 30. The total output of the peak detectors 26 and 28 is then the data signal maximum excursion (or the difference between the maximum and minimum excursions of the data signal when the minimum excursion is not zero) because the negative offset voltage portion at the output of the two input peak detector 26 cancels out the positive offset voltage output of the negative peak detector 28. Halving the total output of the peak detectors 26 and 28, the resistor network 30 produces a reference threshold voltage at the output amplifier 20 that is substantially equivalent to one-half of the data signal maximum excursion (or one-half of the difference between the maximum and minimum excursions of the data signal when the minimum excursion is not zero).

In another embodiment of the invention, the signal processor 18 sets the reference threshold to a fractional value or part of the sum of the difference amplitude and the offset voltage. The fractional value is selected so that the reference threshold is approximately equal to one-half of the difference amplitude. A exemplary fractional value for a typical offset voltage may be between 30% and 40%. As a result, the reference threshold is set by the signal processor 18 to the desirable approximate middle position, or mid-point between the maximum and minimum excursions without the undesirable addition of the offset voltage to the threshold as in the previously known adaptive threshold approach. Optionally, a selector 24 may be connected to the signal processor 18 to enable selective variation of the fractional value to compensate for changes in the offset voltage.

Figure 3:
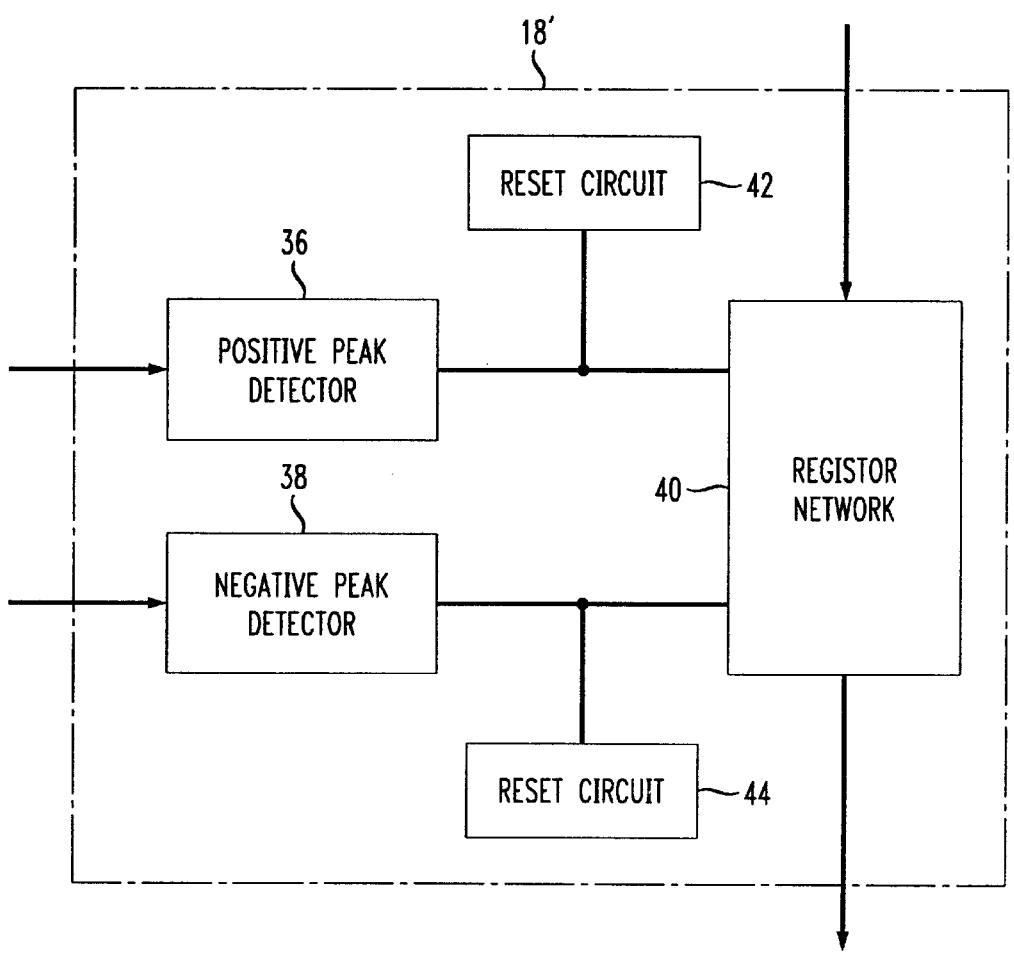
FIG. 3 is an exemplary block diagram of a signal processor of a second embodiment of the reference threshold setting system of FIG. 1 in accordance with the present invention.

An exemplary signal processor 18' of this alternate embodiment of the invention is shown in FIG. 3. The signal processor 18' includes a positive peak detector 36, having an input connected to the offset generator 16, for detecting the maximum excursion of the data signal, a negative peak detector 38, having an input also connected to the offset generator 16, for detecting the minimum excursion of the data signal, and a resistor network 40, connected to the outputs of the positive peak detector 36 and the negative peak detector 38, for setting the reference threshold equal to a fractional value of one-half of the total output (i.e. the sum of the difference amplitude and the offset voltage amplitude) of the positive peak detector 36 and the negative peak detector 38. Optionally, a reset circuit 42 may be connected to the output of the positive peak detector 36, and a reset circuit 44 may be connected to the output of the negative peak detector 38, for discharging the positive peak detector 36 and for charging the negative peak detector 38, respectively, at the end of a data signal burst. Because the minimum excursion of the data signal is typically zero, the negative peak detector 38 outputs the amplitude of the offset voltage generated by the offset generator 16. The positive peak detector 36 outputs the maximum excursion of the data signal. The resistor network 40 then receives the sum of the maximum excursion and the offset voltage amplitude and sets the reference threshold to a predetermined fractional value or part of the sum.

Because typical offset voltages used in burst mode receivers are known in advance, the fractional multiplier applied to the sum to determine the fractional value is selected so that the reference threshold is approximately equal to one half of the difference amplitude. For typical offset voltages, the fractional value may be set between about 30% and 40% of the sum. The resistor network 40 may be implemented in a variety of ways. For example, the resistor network 40 may comprise a set of two resistors (not shown), with respective values of R1 and R2, arranged in series between the outputs of the positive peak detector 36 and the negative peak detector 38. To produce a particular fractional value, R1 and R2 may be varied in accordance with the following expression: fractional value $=R2/(R1+R2)$. For example, for a fractional value of 50%, or 0.5 (as in the above described adaptive threshold technique), R1 is equal to R2. The optional selector 24 can operatively vary the values of R1 and R2 to produce different fractional values in order to compensate for changes in the offset voltage.

Thus, while there have shown and described and pointed out fundamental novel features of the invention as applied to preferred embodiments thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. It is the intention, therefore, to be limited only as indicated by the scope of the claims appended hereto.

I claim:

1. A system for setting a reference threshold in a burst mode receiver having an input and an output for receiving, in intermittent bursts through the input, a digital data signal having a minimum and a maximum excursion, comprising:

offset generator, connected to the receiver input, that applies an offset voltage of a predefined amplitude to the data signal, said predefined amplitude being sufficient to generate a substantially null output signal at the receiver output when no data signal is received at the receiver input, to thereby reduce noise distortion effects at the output of the receiver; and signal processor, connected to said offset generator and to the receiver output, that:

derives a difference amplitude by determining a difference between the maximum and minimum signal excursions;

compares the difference amplitude to an offset threshold, the offset threshold being substantially equal to twice the offset voltage predefined amplitude, and (i) when the difference amplitude is less than the offset threshold, sets the reference threshold substantially equal to the offset voltage, so that the reference threshold is substantially equivalent to the null output signal at the output of the receiver, and (ii) when the difference amplitude is one of substantially equal to and greater than the offset threshold, sets the reference threshold substantially equal to approximately one-half of the difference amplitude.

2. The system of claim 1, further comprising a transimpedance preamplifier connected between the receiver output and said offset generator for amplifing the data signal in accordance with a first predetermined amplification magnitude.

3. The system of claim 1, further comprising an output amplifier connected between said signal processor and the receiver output for amplifying the data signal in accordance with a second predetermined amplification magnitude.

4. The system of claim 1, wherein said signal processor comprises:

a positive peak detector having an output, for detecting the maximum excursion of the data signal;

a negative peak detector having an output, for detecting the minimum excursion of the data signal, wherein the difference amplitude is determined by combining outputs of said respective positive and negative peak detectors; and a resistor network, connected to said respective positive and negative peak detector outputs, for generating a output value substantially equivalent to one-half of the difference amplitude.

5. The system of claim 4, further comprising:

first reset circuit, connected to said positive peak detector, for discharging said positive peak detector at an end of the data signal burst; and second reset circuit, connected to said negative peak detector, for charging said negative peak detector at the end of the data signal burst, so that said positive and negative peak detectors are prepared for receiving a next data signal burst.

6. A method for setting a reference threshold in a burst mode receiver, having an input and an output for receiving, in intermittent bursts through the input, a digital data signal having a minimum and a maximum excursion, comprising the steps of:

(a) applying, by an offset generator connected to the receiver input, an offset voltage of a predefined amplitude to the data signal, said predefined amplitude being sufficient to generate a substantially null output signal at the receiver output when no data signal is received at the receiver input, to thereby reduce noise distortion effects at the output of the receiver;

(b) deriving, in a signal processor connected to the offset generator and to the receiver output, a difference amplitude by determining a difference between the maximum and minimum signal excursions;

(c) comparing, in the signal processor, the difference amplitude to an offset threshold, the offset threshold being substantially equal to twice the offset voltage predefined amplitude; and (d) when the difference amplitude is less than the offset threshold, setting, by the signal processor, the reference threshold substantially equal to the offset voltage, so that the reference threshold is substantially equivalent to the null output signal the output of the receiver; and (e) when the difference amplitude is one of substantially equal to and greater than the offset threshold, setting, by said signal processor, the reference threshold substantially equal to one half of the difference amplitude.

7. The method of claim 6, further comprising the step of:

(f) prior to said step (a) amplifying, in a transimpedance preamplifier connected between the receiver output and the offset generator, the data signal in accordance with a first predetermined amplification magnitude.

8. The method of claim 6, further comprising the step of:

(f) after said step (e), amplifying in an output amplifier connected between the signal processor and the receiver output, the data signal in accordance with a second predetermined amplification magnitude.

* * * * *